United States Patent
Maltsev

[19]
[11] Patent Number: 6,064,763
[45] Date of Patent: *May 16, 2000

[54] TIME-EFFICIENT METHOD OF ANALYZING IMAGED INPUT DATA TO LOCATE TWO-DIMENSIONAL MACHINE-READABLE SYMBOLS OR OTHER LINEAR IMAGES THEREIN

[75] Inventor: Pavel A. Maltsev, Edmonds, Wash.

[73] Assignee: Intermec IP Corporation, Beverly Hills, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/687,659

[22] Filed: Jul. 26, 1996

[51] Int. Cl.$^7$ .............................. G06K 9/48; G06K 9/18; G06K 7/10

[52] U.S. Cl. ........................ 382/183; 382/199; 235/462

[58] Field of Search .................................. 382/199, 286, 382/287, 289, 291, 175, 177–179, 184, 101–102, 141–142, 151, 153, 311, 183, 132; 235/472, 462, 470

[56] References Cited

U.S. PATENT DOCUMENTS

| | | | |
|---|---|---|---|
| 2,612,994 | 10/1952 | Woodland et al. | 209/111 |
| 4,013,893 | 3/1977 | Hertig | 250/568 |
| 4,687,942 | 8/1987 | Takagi et al. | 250/556 |
| 4,874,936 | 10/1989 | Chandler et al. | 235/494 |
| 4,916,298 | 4/1990 | Raphaël | 235/463 |
| 4,998,010 | 3/1991 | Chandler et al. | 235/494 |

(List continued on next page.)

OTHER PUBLICATIONS

*About Aztec Code Rev. 2.0*, Welch Allyn, Inc. Data Collection Division, Skaneateles Falls, New York, Jul. 7, 1995, pp. 1–7 plus drawing.

*Uniform Symbology Specification–MaxiCode*, AIM USA Technical Specification, Pittsburh, Pennsylvania, May 19, 1995, Draft, pp. 1–39.

Russ, John C., *The Image Processing Handbook*, CRC Press, Boca Raton, Florida, Nov. 1994, pp. 170–189.

*Uniform Symbology Specification Code One*, AIM USA Technical Specification, Pittsburg, Pennsylvania, Jul. 1994, pp. 1–32.

Pavlidis, Theo, et al., "Information Encoding with Two–Dimensional Bar Codes," *Computer*, Jun., 1992, pp. 18–28.

Palmer, Roger C., *The Bar Code Book*, 2d ed., Helmers Publishing, Inc., New Hampshire, 1991, pp. 19–20, 61–62, 90–95, 137–148.

Davies, E.R., *Machine Vision: Theory, Algorithms, Practicalities*, Academic Press, London, 1989, pp. 206–215 amd 265–271.

Ackley, Sprague, "Verification—New Insight for An Old Debate," *Scan–Tech '87*, Oct. 13, 1987, pp. 1–17.

Gonzalez, Rafael C. and Paul Wintz, *Digital Image Processing*, Addison–Wesley Publishing Company, Reading, Massachusetts, 1977, pp. 36–47.

*Primary Examiner*—Thomas D. Lee
*Assistant Examiner*—Wenpeng Chen
*Attorney, Agent, or Firm*—Perkins Coie LLP

[57] ABSTRACT

A method and apparatus locates edges of patterns in a stored image, such as edges of start/stop patterns of machine-readable symbols (e.g., PDF 417 symbols). The present invention first divides the stored image into analysis regions and samples each region using a 16-beam star pattern. The beam patterns are analyzed to detect for edges that may correspond to edges of start/stop patterns of the symbol. Coast lines, or elongated edges, of the detected edges are analyzed for parallelism and minimal length to filter out any spurious detected edges. Thereafter, the coast lines are analyzed to confirm that a start or stop pattern has been located. A second start/stop pattern is thereafter located, boundary points are determined at a periphery of the symbol, and finally the symbol is analyzed for its geometric shape to confirm that the located boundary points conform to an accepted geometry for this symbol.

37 Claims, 11 Drawing Sheets

U.S. PATENT DOCUMENTS

| | | | |
|---|---|---|---|
| 5,080,456 | 1/1992 | Katz et al. | 359/214 |
| 5,189,292 | 2/1993 | Batterman et al. | 235/494 |
| 5,241,166 | 8/1993 | Chandler | 235/494 |
| 5,276,315 | 1/1994 | Surka | 235/462 |
| 5,319,181 | 6/1994 | Shellhammer et al. | 235/462 |
| 5,324,923 | 6/1994 | Cymbalski et al. | 235/454 |
| 5,373,147 | 12/1994 | Noda | 235/462 |
| 5,376,780 | 12/1994 | Klueter | 235/462 |
| 5,418,862 | 5/1995 | Zheng et al. | 382/199 |
| 5,438,636 | 8/1995 | Surka | 382/279 |
| 5,523,552 | 6/1996 | Shellhammer et al. | 235/462 |
| 5,635,697 | 6/1997 | Shellhammer et al. | 235/462 |

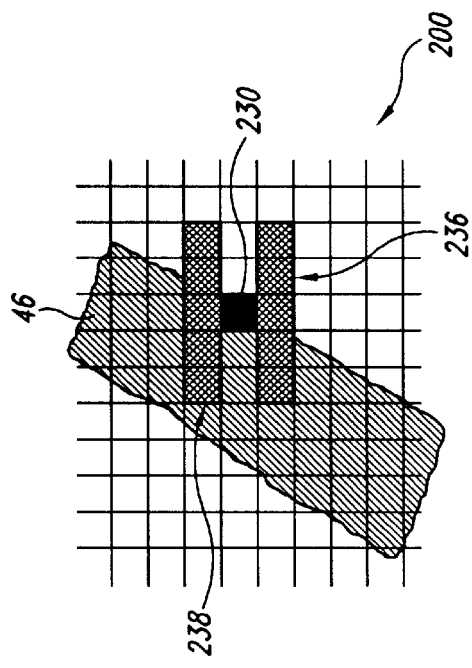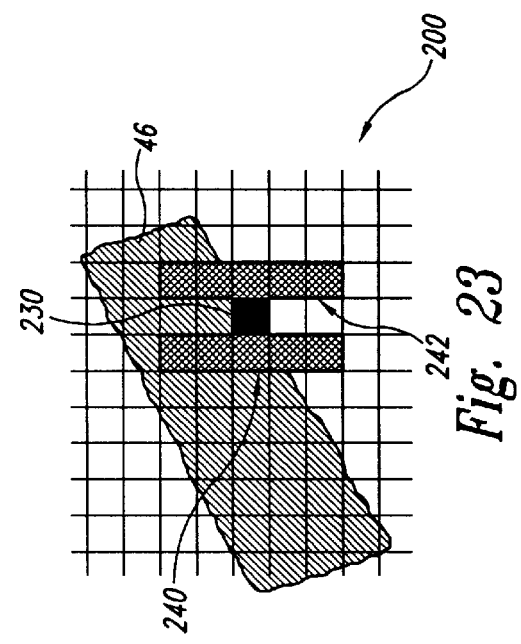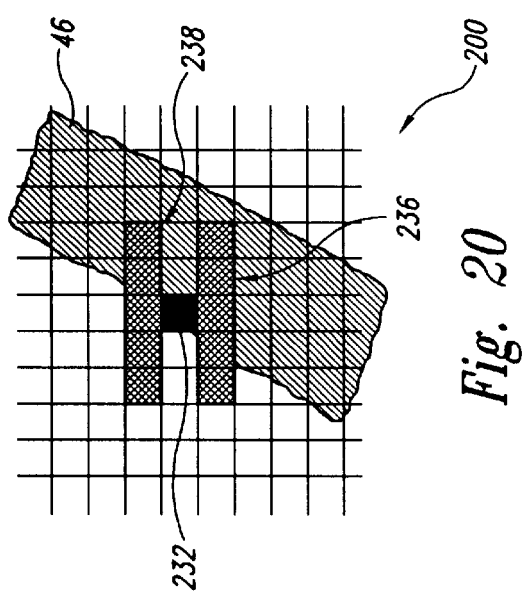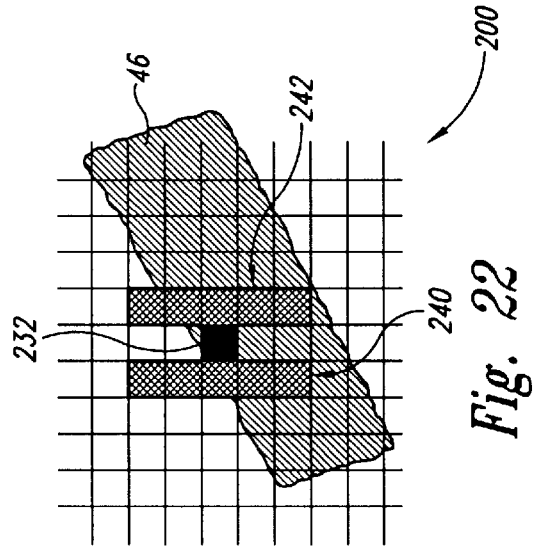

TIME-EFFICIENT METHOD OF ANALYZING IMAGED INPUT DATA TO LOCATE TWO-DIMENSIONAL MACHINE-READABLE SYMBOLS OR OTHER LINEAR IMAGES THEREIN

TECHNICAL FIELD

This invention relates to optical reading systems for bar codes and other machine-readable symbols and, more particularly, to locating portions of symbols or images within a stored two-dimensional image.

BACKGROUND OF THE INVENTION

Systems for optically scanning patterns and then analyzing the data to "recognize" the patterns are well known in the art and are now a part of everyday life for most people. The most common form of optical pattern recognition is depicted in FIG. 1 as a simplified version of the common linear or one-dimensional bar code 10. One-dimensional bar codes appear on virtually all products and are scanned by fixed or hand-held scanners by checkout clerks and the like.

As depicted in FIGS. 1 and 2, a scanning beam 12 is scanned across the bar code 10 by the scanning device. A string of reflectance values are thereby produced which represent the transitions from bars to spaces along the scanning beam 12. Alternatively, an entire image or "snapshot" of the symbol 10 is taken by the reader. The data as reflected from the bar code 10 is then placed into a computer memory 14 on a pixel-by-pixel basis as pixel data 16, as depicted in FIG. 3 where each square in FIG. 3 represents a unique memory location. Since the data is one dimensional, it does not really matter whether the scanning takes place perpendicular to the bar code 10 as depicted in FIG. 1 or at an angle as depicted in FIG. 2. Similarly, it does not matter whether the pixel data 16 are located one-dimensionally or two-dimensionally within the computer memory 14 since it is an easy matter to analyze the data to determine the contents thereof Optical Character Recognition (OCR) as it relates to the ability to "read" alphanumeric characters is another matter since the data are now related to a two-dimensional character. Thus, the problem is different if a character 18 being "scanned" is oriented in a known perpendicular direction as in FIG. 4 or skewed as in FIG. 5. While the character 18 can be scanned on a line-by-line basis by a raster scanning technique, it is easier and most common to simply view the character 18 two-dimensionally with, for example, a charge coupled device (CCD) camera which provides pixel data 16 within a computer memory 14 in the manner depicted in FIG. 6.

The contents of the computer memory 14 must then be analyzed on a correlated line-by-line basis as depicted in FIG. 7. The prior art techniques for analyzing the data from each line 20 of the memory 14 are complex and time-consuming, particularly if multiple fonts are to be "recognized" and orientations other than perpendicular are to be included. As can be appreciated, the prior art methodology of character recognition from the data 16 on a horizontal and vertical basis (i.e., line-by-line forward and backward and across each line pixel position-by-pixel position) cannot be accomplished in real-time. That is, the data must be scanned and they analyzed in a process that can literally take minutes for a standard page of characters.

Recently, there is a movement towards implementing area or two-dimensional bar codes to mark products. One-dimensional bar codes simply cannot contain enough data within a reasonable space. A so-called "SKU" or inventory identification number is about the limit of their ability.

By going to a two-dimensional bar code as depicted in FIG. 8, much more data can be represented in a much smaller space. FIG. 8 shows a so-called "Code-One" type of bar code 22. Code-One bar codes are of various types; but, each contains two components—an orientation pattern 24 and attached 2D data 26. A portion of the orientation pattern 24 from the bar code 22 of FIG. 8 is shown in FIG. 9. The orientation pattern 24 comprises a central portion 28 that defines the type of Code-One bar code present and is uniquely identifiable and locatable as to orientation; and, peripheral portions 30 that define the extents and sizing of the 2D data 26.

For our purposes, it is the central portion 28 that is of interest. The central portion 28 has a plurality of "vertical" edges 32 and "horizontal" edges 34 when the bar code 22 is in its proper orientation, and the edges are in a fixed relationship to one another. Thus, regardless of the orientation, if the vertical and horizontal edges can be found, the type of bar code 22 can be determined, its orientation can be determined, and the 2D data 26 can be interpreted.

FIG. 10 shows another two-dimensional symbol, namely a PDF 417 symbol 40. The orientation pattern consists of start and stop patterns 42 and 44. The start and stop patterns include very large or wide, bars relative to the rest of the symbol, 46 and 48, respectively. The bars 46 and 48 can be found within the stored image (e.g., by locating their elongated edges), and thus the position and type of the bar code 40 can be determined. Thereafter, three rows of bars and spaces 39 positioned between the start and stop patterns 42 and 44 can be decoded.

Prior art techniques still approach the problem in the same manner as working with alphanumeric data as described above. All the pixels of the scanned 2D image are stored in a computer memory and then the data are analyzed on a line-by-line basis trying to make sense of it. As can be appreciated, there is a big difference between recognizing an "H" surrounded by white space and recognizing one of many orientation patterns 24 within the bar code 22 as in FIG. 8, or the start and stop patterns 42 and 44 within the bar code 40 as shown in FIG. 10.

When it comes to scanning these two-dimensional bar codes at a point of sale, work station, or the like, there is not time for a recognition process which takes minutes to accomplish. The finding and unpacking of the data must take place in real-time or close to real-time. A typical consumer requirement is to have the data available in one second or less. Therefore, it is desirable to provide a method of analyzing optically scanned data associated with two-dimensional symbols or characters which can find and unpack the data in real-time or close to real-time.

SUMMARY OF THE INVENTION

The present invention solves problems of the prior art and provides additional benefits by locating at least one of the start/stop patterns 42 or 44 of the symbol 40, or other symbols or linear visual elements in a stored image by essentially performing seven sequential steps:

(1) dividing the stored image into analysis regions and sampling each region using a 16-beam star pattern;

(2) analyzing the beam patterns to detect for edges that may correspond to edges of the start or stop patterns of the symbol;

(3) analyzing "coast lines" of the detected edges for parallelism and minimum length to filter out any spurious detected edges;

(4) confirming and accepting a located start or stop pattern;

(5) identifying pairs of start/stop patterns;

(6) determining boundary points at a periphery of the symbol; and (7) analyzing the symbol for its geometric shape to confirm that the located bounding points, and corresponding boundary box, conform to an accepted geometry of the symbol. After the symbol has been located in the stored image, it can be readily decoded.

In a broad sense, the present invention preferably embodies several methods of analyzing a stored image. The present invention includes a computer implemented method for locating one or more predetermined elongated shapes in an image stored in a data storage device. The stored image possibly includes additional elongated shapes. The method includes the steps of: (a) dividing the stored image into a plurality of analysis regions; (b) sampling at least one region along a plurality of sampling paths; (c) locating a first elongated edge based on the sampled sampling paths; (d) determining if the located first elongated edge is an edge of the predetermined elongated shape; and (e) defining the location of the predetermined elongated shape based on the located first elongated edge.

The present invention also embodies a computer implemented method of analyzing an image stored in the data storage device for a predetermined shape. The method includes the steps of defining a point within the stored image, and sampling the stored image along a plurality of approximately linear sampling paths for the predetermined shape, wherein each sampling path extends from the defined point. Furthermore, the present invention embodies a method of dividing the stored image into a plurality of analysis regions, each region having an area, and sequentially sampling each region for the predetermined shape.

BRIEF DESCRIPTION OF THE DRAWINGS

FIGS. 20 and 21 depict the enlarged wide bar being analyzed according to the present invention and depicting upper and lower searching templates employed therein.

FIGS. 22 and 23 depict the enlarged wide bar being analyzed according to the present invention and depicting left and right searching templates employed therein.

DETAILED DESCRIPTION OF THE INVENTION

While the present invention is equally applicable to any kind of two-dimensional image recognition system, the description which follows hereinafter will be with respect to a tested two-dimensional bar code system. It is intended that the protection afforded the invention by the disclosure and appended claims be in accord with the scope and spirit of the disclosure and not be limited by the use of a specific example.

Figure 11:
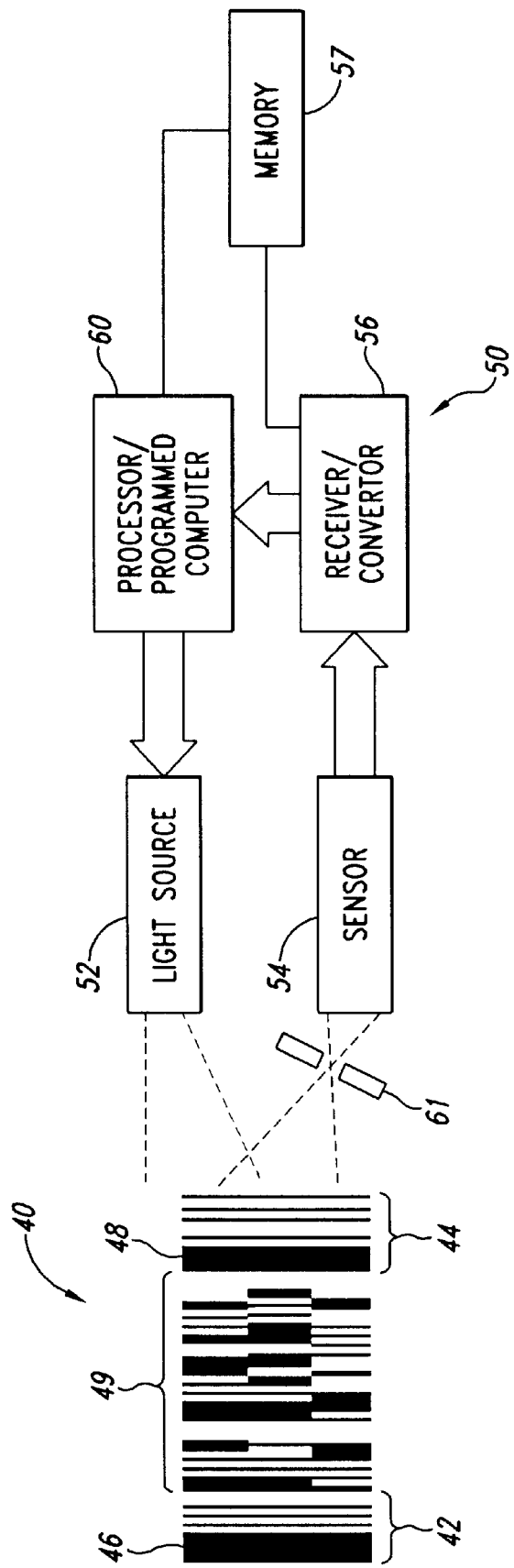
FIG. 11 is a block diagram of an exemplary implementation of the present invention for reading machine readable symbols or other images.

As shown in FIG. 11, a data collection symbology reader 50 of the present invention includes a light source 52 that illuminates a data collection or other symbol, such as the PDF 417 symbol 40. As used herein, a "data collection symbol" refers to a symbol from any linear, stacked, area or other machine-readable symbology. A sensor 54 having an optical aperture 61, receives light reflected from the symbol 40 and converts the received light into an electrical signal or profile. For example, the light source 52 can be an LED, flashbulb, infrared light source, rasterizing laser, or other light-emitting element, while the sensor 54 can be a one- or two-dimensional CCD, semiconductor array, photodetector, vidicon, or other area imager capable of converting received light into electrical signals. Additionally, the present invention can omit the light source 52, and rely on ambient light.

A receiver or converter 56 receives the electrical signal from the sensor 54 and converts into a signal to be processed by a programmed computer or processor 60. Typically, the sensor 54 produces an analog profile signal that represents the modulated light reflected from the elements in the symbol 40. Importantly, if the processor 60 is a digital computer, then the converter 56 converts each pixel in the image of the symbol 40 from an analog signal produced by the sensor 54 to a multi-level digital signal that numerically represents the various amplitudes of the analog signal. The converter 56 and/or processor 60 are coupled to memory 57 for storing the profile in digital form. The converter 56, memory 57 and processor 60 can be monolithically integrated.

The sensor 54 can be a charge-coupled device ("CCD") or similar area imager having a active surface such as a rectangular surface of M by N pixel elements, e.g., 582 by 752 pixel elements. As is known, each pixel element in the CCD array of the sensor typically outputs a gray level signal, i.e., an analog signal that determines the amount or intensity of light impinging upon the particular pixel element, similar to a video data signal. The converter 56 preferably converts the gray level signal into a digital signal having, for example, 16 levels of gray for use by the processor 60. The memory 57 stores the digital signals, and preferably includes both volatile and non-volatile memory (e.g., random access and electrically, erasable read-only memory). As a result the reader 50 allows an object or image within the field of view of the sensor 54 to be converted into electrical signals that are digitized and stored as a stored image in the random access portion memory 57 to be retrieved and processed by the processor 60 under a routine 100 stored in the read-only memory (as described below). After processing the stored image, the processor 60 can output the results of such processing to a peripheral apparatus or a computer (not shown).

Figure 25:
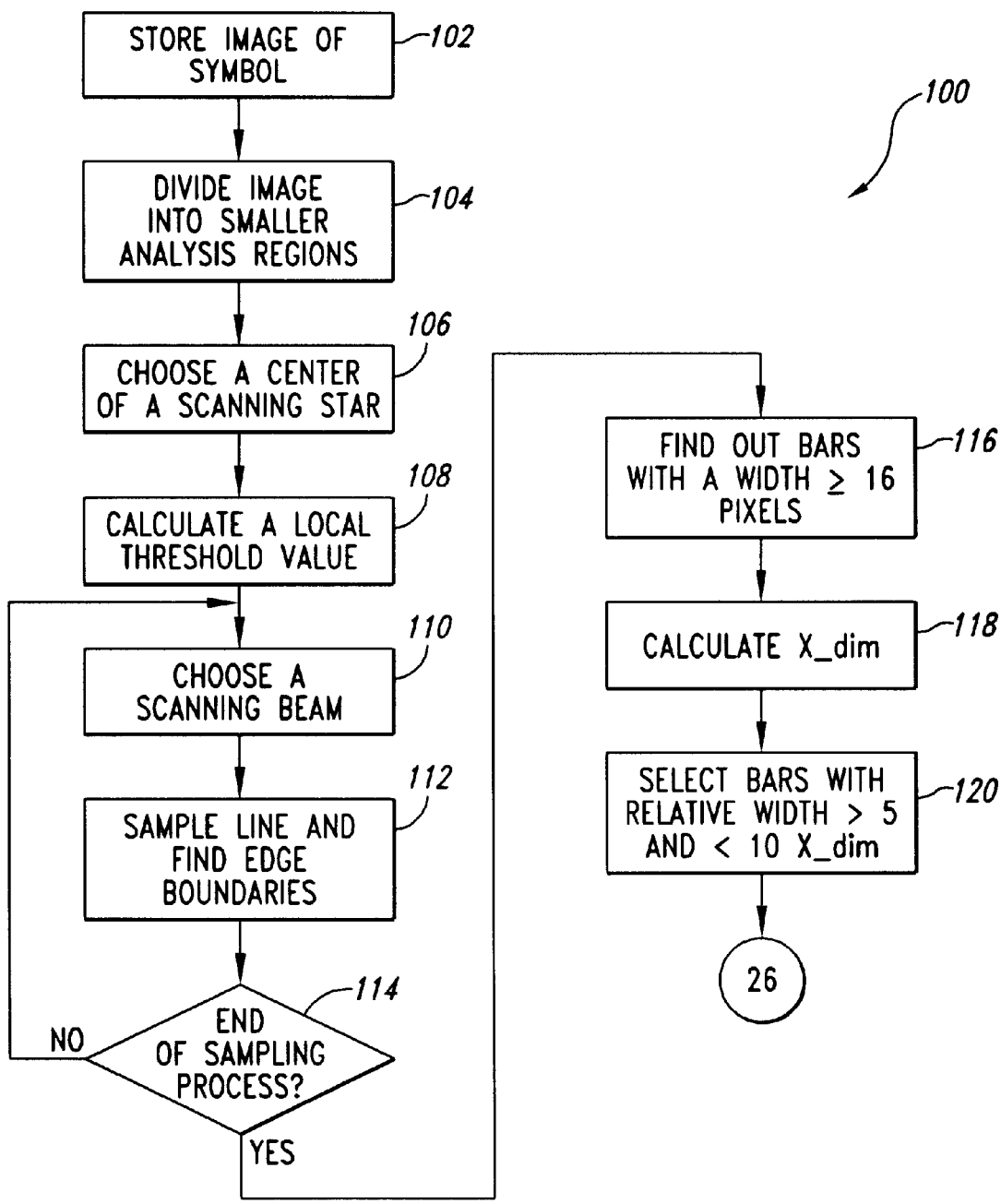
Figure 26:
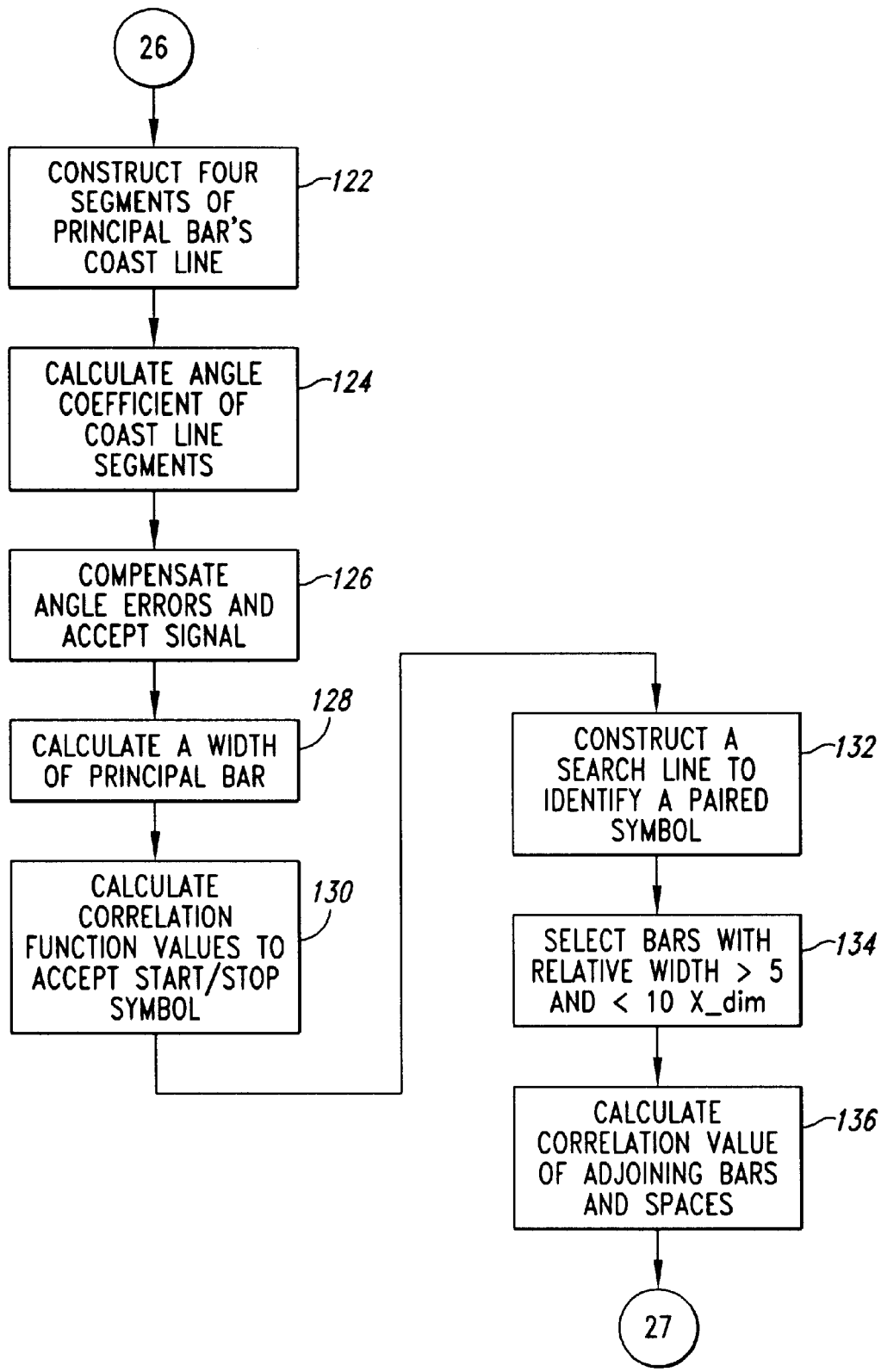
Figure 27:
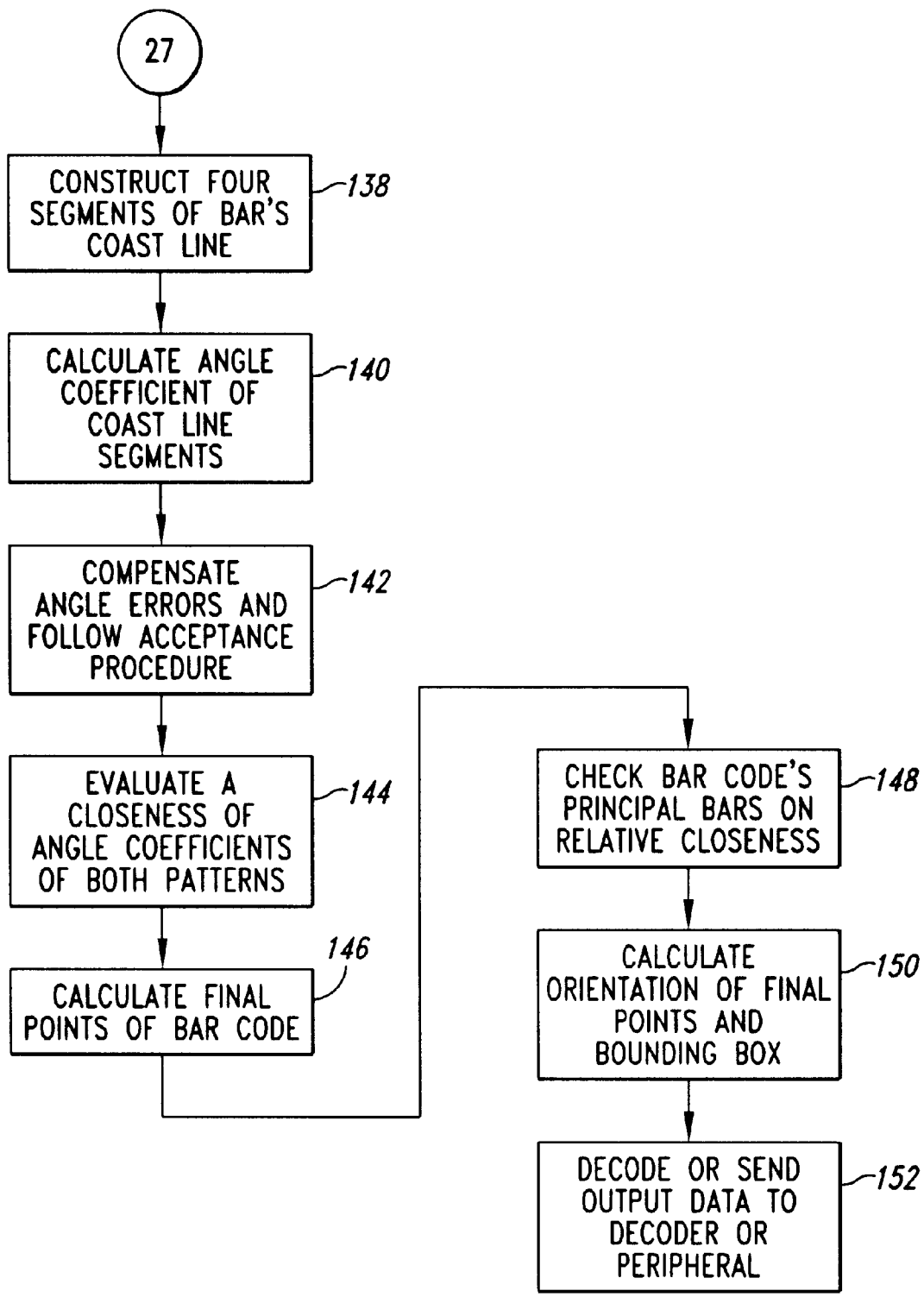

Referring to FIGS. 25–27, an exemplary routine 100 performed by the eader 50 of the present invention first locates the image of the symbol 40 within a stored image, and then decodes the symbol. As used herein, the term "stored image" generally refers to the overall image of the field of view stored in the memory 57 that has been produced by the sensor 54 and the processor 60, and which contains the symbol 40 or other symbols to be decoded. For processing efficiency, if the CCD in the sensor 54 has an array of 582 by 752 pixels, then the memory 57 includes a 582 by 752 array of memory locations addressed by the processor 60 that correspond to the array of pixels. The stored image in the memory 57 is preferably referenced by a Cartesian coordinate system so that the location of each pixel is represented by a pair of numbers indicating the horizontal and vertical position of the pixel in the stored image. For example, the first pixel in the top left corner of the stored image is assigned the Cartesian coordinates (0, 0), while the bottom right-most pixel is assigned the coordinates (751, 581). Therefore, objects within the stored image, i.e., groups of pixels, can be arithmetically located using geometric and trigonometric properties based on the coordinate system (e.g., equations of lines, circles, or other geometric or trigonometric equations used for representing planar objects, as described below). As used herein, the term "locates" generally refers to determining both the position and orientation of the image of an object within the stored image.

The routine 100 begins in step 102 where the reader scans or stores an image of the symbol 40. For example, the reader 50 can be a hand-held product and include a trigger switch (not shown) coupled to the processor 60 that causes the light source 52 to illuminate the symbol 40, and allow the sensor 54, converter 56 and processor 60 to store an image of the symbol in the memory 57 upon actuation of the switch. The specific means and method for storing an image of a symbol by the reader 50 are conventional and will be understood by those skilled in the relevant art without need for further description herein.

In step 104, the processor 60 begins to locate the symbol 40 within the stored image. The ultimate goal of the present invention is to determine the location of at least one of the start and stop patterns 42 or 44 for the symbol 40. By determining the location of the start or stop pattern for the symbol 40, the reader 50 can determine an orientation and boundary or size of the symbol, and thereby more readily locate the bars and spaces within the symbol, and consequently rapidly decode the symbol. In general, the terms "point" and "pixel" are used interchangeably herein.

The present invention locates at least one of the start/stop patterns 42 or 44 of the symbol 40 by essentially performing seven sequential steps:

(1) dividing the stored image into analysis regions and sampling each region using a 16-beam star pattern;

(2) analyzing the beam patterns to detect for edges that may correspond to edges of the start or stop patterns of the symbol;

(3) analyzing "coast lines" of the detected edges for parallelism and minimum length to filter out any spurious detected edges;

(4) confirming and accepting a located start or stop pattern;

(5) identifying pairs of start/stop patterns;

(6) determining boundary points at a periphery of the symbol; and (7) analyzing the symbol for its geometric shape to confirm that the located bounding points, and corresponding boundary box, conform to an accepted geometry of the symbol.

Figure 12:
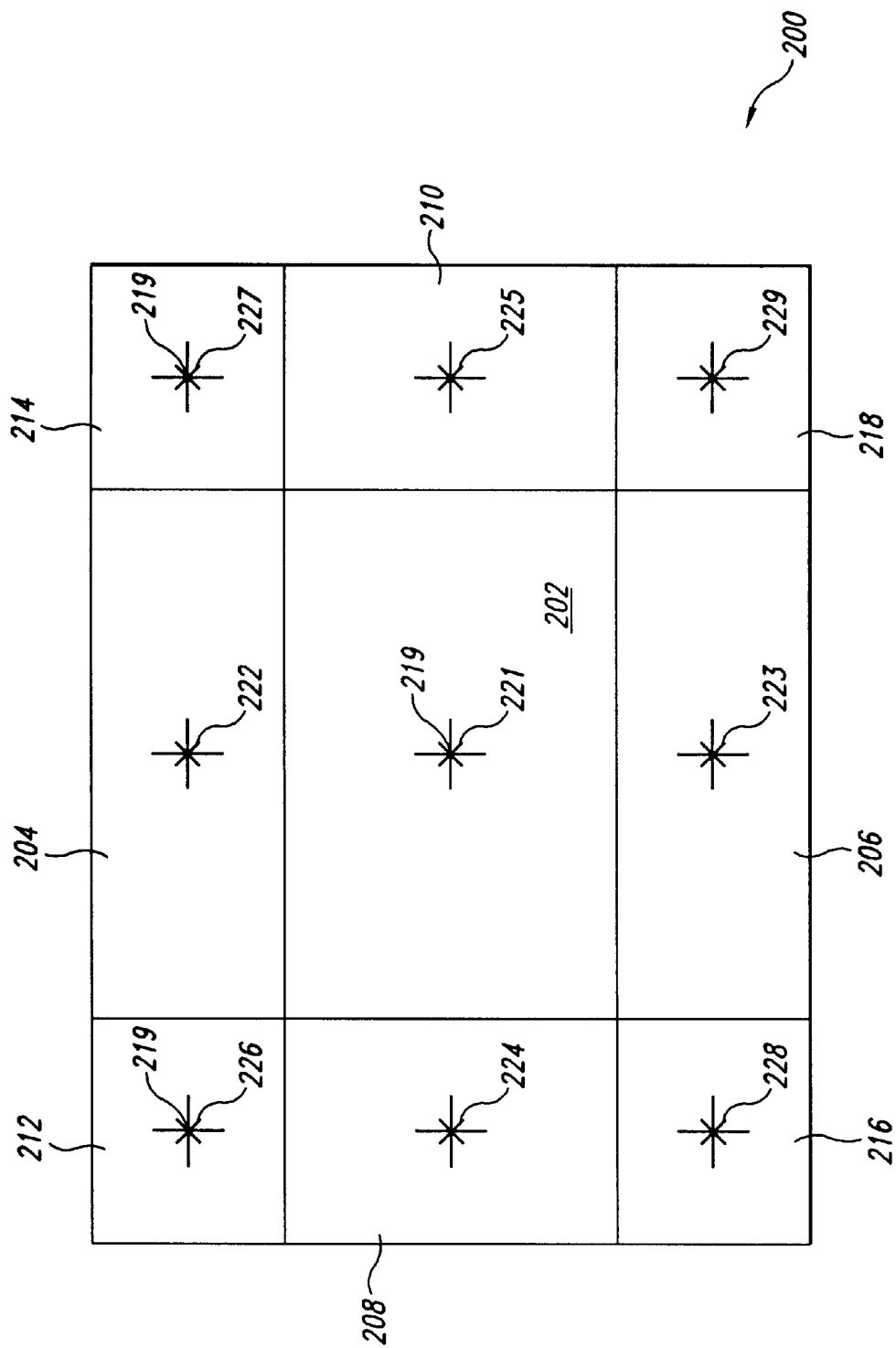
FIG. 12 is a schematic diagram of a stored image taken by the reader of FIG. 11, where the image is divided into nine analysis regions under the present invention.
Figure 16:
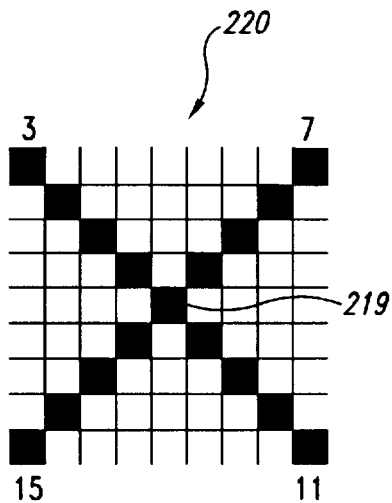
Figure 17:
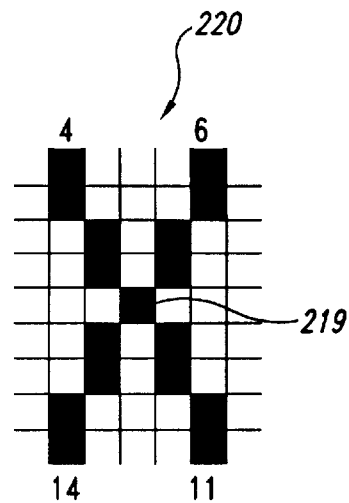

Therefore, under the first step above, the processor 60 in step 104 first divides the stored image into smaller analysis regions, preferably nine of such regions as shown in FIG. 12. Referring to FIG. 12, a generally rectangular stored image 200 is divided into nine regions: a central region 202, top and bottom regions 204 and 206, left and right regions 208 and 210, upper left and right corner regions 212 and 214 and lower corner left and right regions 216 and 218, respectively. The center region 202 comprises the largest area of the stored image 200, while the left and right and top and bottom regions 204, 206, 208 and 210 consist of regions having an area less than the center region 202, but greater than an area of the corner regions 212, 214, 216 and 21 8. For example, if the stored image 200 were divided into 16 areas of equal size or "unit areas," in a 4×4 matrix, the corner regions 212, 214, 216 and 218 would each have an area equal to one unit area. The top and bottom left and right regions 204, 206, 208 and 210 would have an area equal to two times the unit area, while the center region 204 would have four times the unit area.

In step 106, the processor 60 locates a center point 219 for each of the nine analysis regions in the stored image 200. The X-axis and Y-axis coordinates of each of the center points are stored in a pair of arrays by the processor 60 for use under the routine 100. Each center point 219 will become a center point for a scanning or analysis pattern 220 employed by the present invention.

Figure 3:
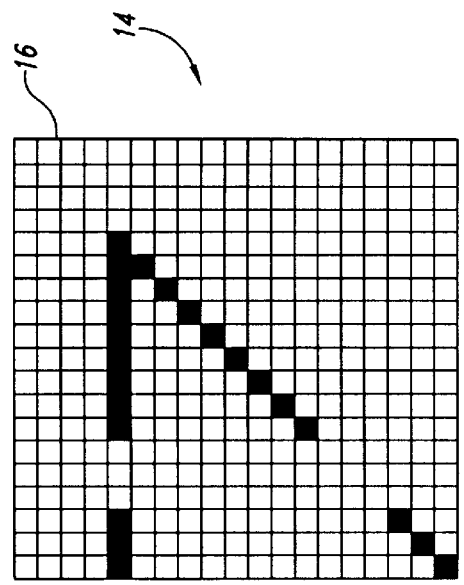
FIG. 3 is a simplified drawing depicting the pixel data created in a computer memory by the scannings of FIGS. 1 and 2.
Figure 6:
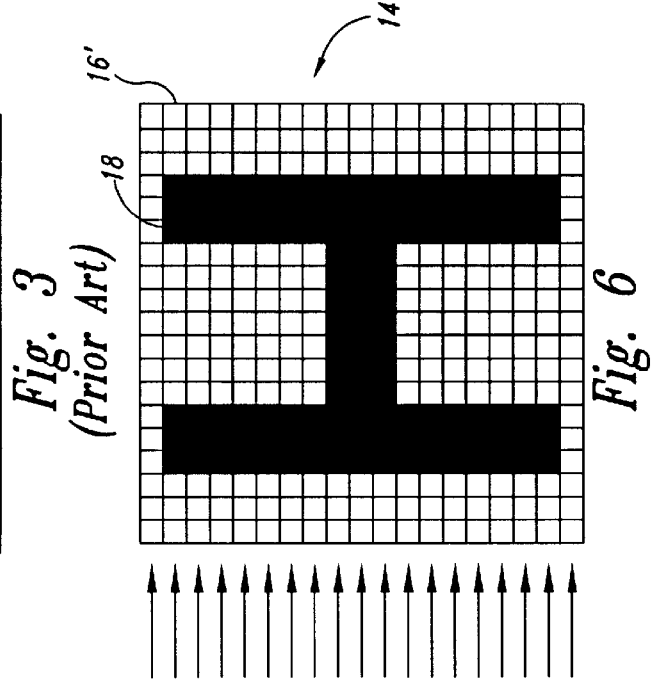
FIG. 6 is a simplified drawing depicting the pixel data created in a computer memory by the scannings or imaging of FIG. 4.
Figure 2:
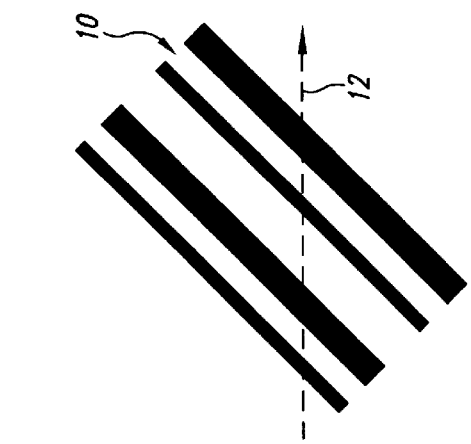
FIG. 2 is a simplified drawing showing a scanning beam scanning across a one-dimensional bar code at an angle to the bar code.
Figure 5:
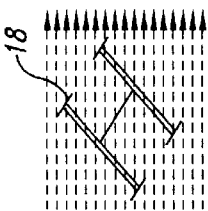
FIG. 5 is a simplified drawing depicting optically scanning across a two-dimensional alphanumeric character at an angle to the character.
Figure 1:
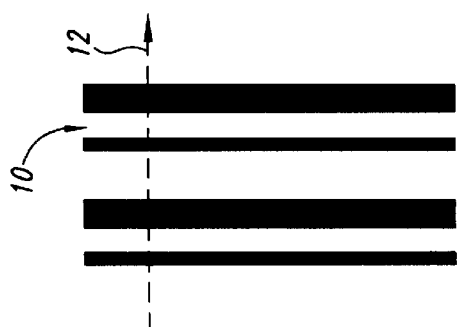
FIG. 1 is a simplified drawing showing a scanning beam scanning across a one-dimensional bar code perpendicular to the bar code.
Figure 4:
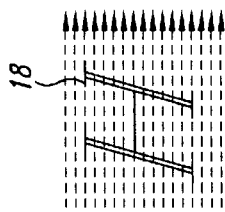
FIG. 4 is a simplified drawing depicting optically scanning across or imaging a two-dimensional alphanumeric character perpendicular to the character.
Figure 13:
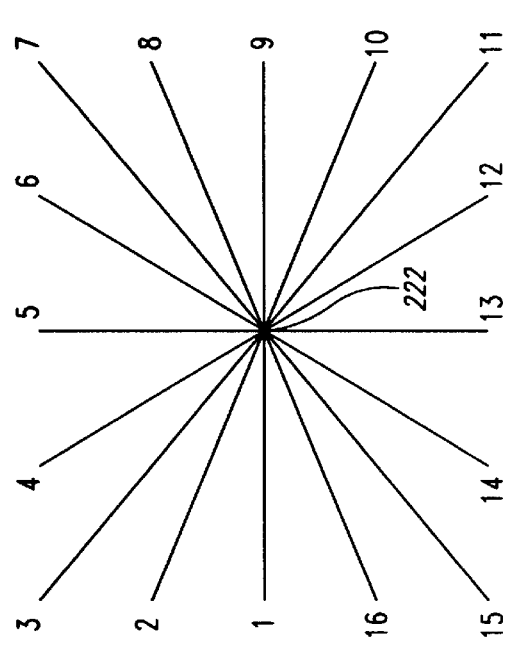
FIG. 13 depicts a "star" data analysis pattern employed by the present invention.
Figure 15:
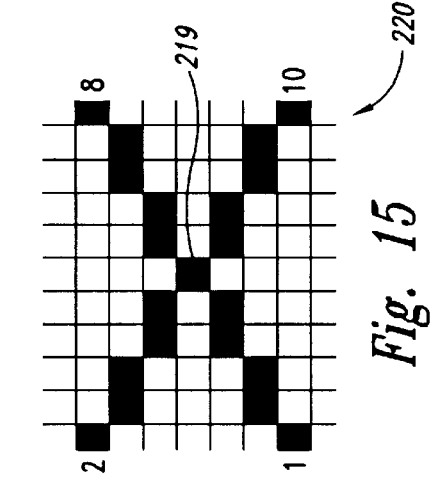
FIGS. 14–17 are drawings showing the actual pixel positions of sampling paths involved for the star pattern in a tested implementation of the present invention.
Figure 14:
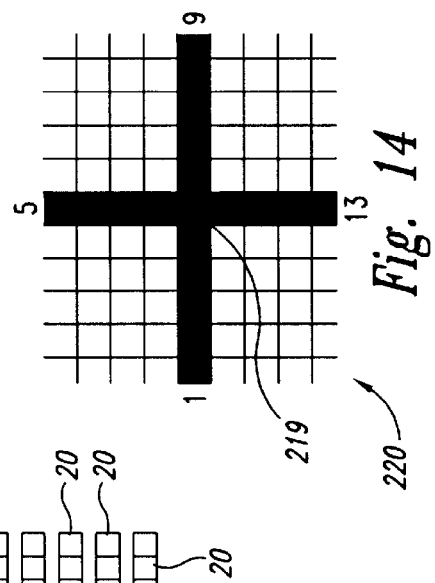
Figure 7:
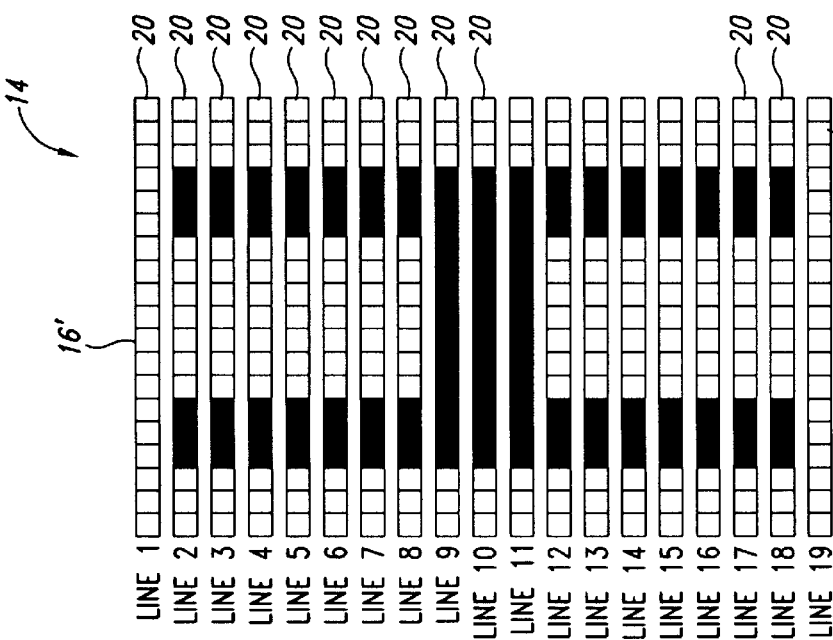
FIG. 7 depicts the individual lines of pixel data in the computer memory which must be analyzed to optically "recognize" the character when doing so according to prior art techniques.
Figure 10:
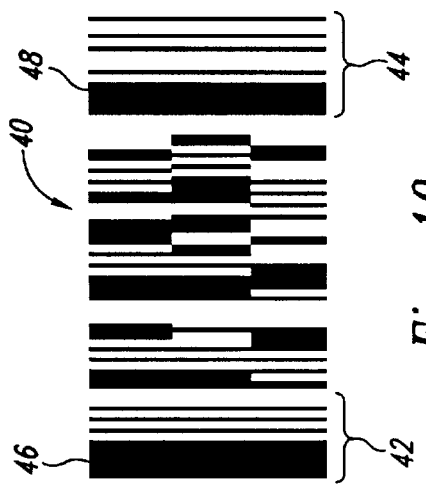
FIG. 10 is a drawing of an exemplary PDF 417 two-dimensional bar code symbol.
Figure 9:
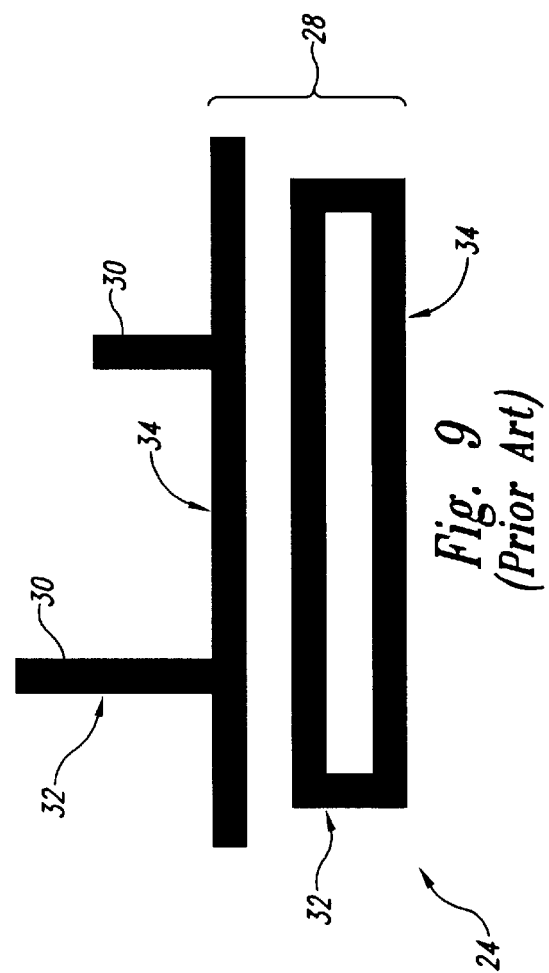
FIG. 9 is a drawing of a portion of the orientation pattern of the symbol of FIG. 8.
Figure 8:
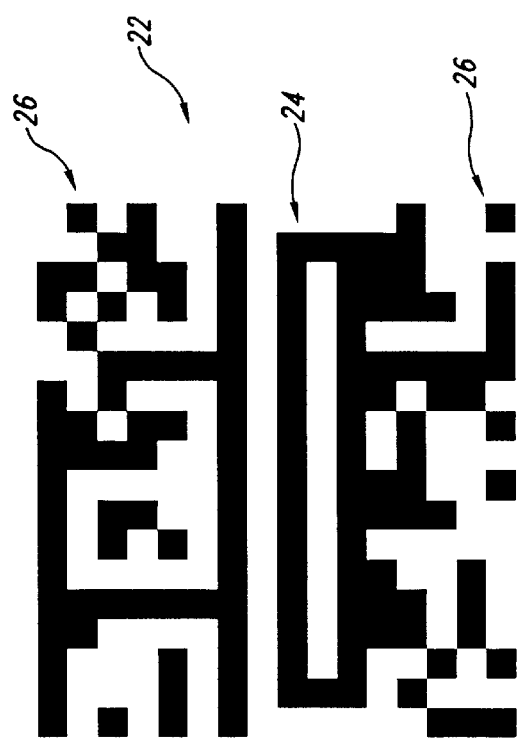
FIG. 8 is a drawing of a Code-One two-dimensional bar code symbol.

An exemplary sampling star pattern 220 is shown in FIG. 13 as consisting of 16 beams that extend from the center point 219. The searching beams of the star sampling pattern 220 have the order and designation as depicted in FIG. 13. In other words, the processor 60 analyzes each of the analysis regions 202–218 by analyzing along each of the 16 beams of the star 220, beginning at the center point 219, and moving outward. The processor 60 first analyzes beam 1, and then continues along beams 2–16, as shown in FIG. 13, in a clockwise manner. To speed up the searching process, the sampling beams are preferably selected with angle increments as follows: 26.565°, 19.435°, 19.435°, 26.565°, 26.565°, 19.435°, 19.435°, 26.565°, 26.565°, 19.435°, 19.435°, 26.565°, 26.565°, 19.435°, 19.435°, and 26.565°. Exemplary pixel sampling structures or patterns for each of the indicated increments of the 16 beams are shown in FIGS. 14–17. If the four exemplary pixel sampling patterns of the FIGS. 14–17 are overlaid upon each other, they produce the preferred 16-beam sampling pattern 220 of FIG. 13.

While only a small 100-pixel area is generally shown in FIGS. 14–17, a larger, or smaller, area within each of the analysis regions 202–218 can be analyzed by the star sampling patterns 220, based on the size of the stored image 200. As can be seen from the drawing figures, the selected sampling structure does not need any extrapolation between pixels, but instead analyzes only one pixel value along each of the 16 beams. Therefore, the routine 100 more rapidly can analyze the stored image 200 since it performs generally integer operations.

The inventor has discovered that users of the reader 50 typically position or "aim" the reader at a center of the symbol 40, such that the stored image of the symbol is often within the center of the stored image 200. As a result, during the first iteration of the routine 100, the processor 60 first analyzes the center analysis region 202, under a center star analysis pattern 221. If a symbol is not located by the routine 100 in the analysis region 202, then the inventor has discovered that users of the reader 50 would typically have positioned the symbol 40 in the following analysis regions, in the following order: top analysis region 204, bottom analysis region 206, left or right analysis regions 208 and 210, and finally corner analysis regions 212–218. For example, a user of the reader 50 may find, after repeated use of the reader, that it becomes heavy and therefore the user drops or lowers the reader with respect to the symbol to be read, so that the symbol is positioned not in the center analysis region 202, but in the top analysis region 204. It is because of these probabilities of the location of the stored symbol 40 within the stored image 200, that the center region 202 preferably has the largest area, the top and bottom and left and right regions 204–210 have the second largest most area, while the corner regions 212–218 have the smallest areas. Furthermore, it is because of these probabilities of the position of the stored symbol within the stored image 200 that the processor 60 analyzes nine star sampling patterns 221–229 in the analysis regions 202, 204, 206, 208, 210, 212, 214, 216 and 218, respectively, and in that order.

In general, step 106 and subsequent steps are performed under the routine 100 for each of the analysis regions 202–218 until the symbol 40 is located and decoded. Additionally, all of the steps of the routine 100 can be repeated if multiple symbols are positioned within the stored image 200 (possibly one or more within each of the analysis regions 202–218).

In step 108, the processor 60 calculates a local threshold value for an intensity or brightness threshold based on a square K×K area of pixels about the center point 219 of the particular star analysis pattern 221–229 being analyzed. The value of K, and thus the area of the square area surrounding the center point 219, depends on the size and resolution of the stored image 200, and can be, for example, a 15×15 pixel area. The local intensity threshold is used to determine a threshold intensity value that defines or separates black pixels from white pixels.

In step 110, the processor 60 chooses one of the 16 sampling beams in the particular star sampling pattern 221–229 currently being analyzed (e.g., the center sampling pattern 221). Therefore, under the first iteration of step 110, the processor 60 selects the sampling beam 1 (FIG. 13), and then in step 112 sequentially samples the chosen beam for changes in intensity or brightness of the pixels from the center point 219 to the edge of the analysis region (e.g., center region 202). The processor 60, in step 112, employs the coordinates of the center point 219 of the sampling star 221, a limit point of the given sampling line (i.e., an end point at which the sampling path exits the center analysis region 202 and enters one of the other analysis regions), and other data, such as a maximum number of edges that can exist (to avoid an infinite loop-type situation).

In the tested embodiment, the routine 100 accumulates an array of pixel locations of "edges," i.e., where the brightness of the pixels changes from "white" to "black" and vice-versa in accordance with the previously established local threshold. In step 114, the processor 60 determines whether each of the sampling paths 1–16 for the star sampling pattern 221 have been analyzed for edge boundaries. If not, then the processor 60 loops back and continues steps 110 and 112 until all edges along each of the sampling paths 1–16 have been located.

The searching routine 100 of the present invention assumes that any edge point determined in step 112 can be an edge point of the start or stop patterns for the symbol 40. To prove that a given edge point is in fact an edge point of one of the start or stop patterns 42 or 44, the routine 100 first filters out those edges corresponding to bars or other objects in the stored image 200 that are too small to be one of the wide bars 46 or 48 in the start/stop pattern. Thereafter, the routine 100 then determines an orientation of the detection edge and intends to locate one of the large bars for the start/stop pattern.

In step 116, the processor 60 analyzes the array of edge locations determined in step 112 and locates all "bars" that have a width of >=16 pixels. In other words, any string of dark pixels, between two located edge points, that is less than 16 pixels, is deemed by the processor 16 to correspond to a small bar, or other optical noise, and not one of the wide bars 46 or 48 of the start/stop patterns 42 or 44. Therefore, "bars" actually refers here to strings of adjacent dark pixels sampled along one of the 16 beams in the star searching pattern. These located bars having a width of greater than 15 pixels are designated as "principal" bars. The inventor has found that there is a strong probability that bars having a width greater than 15 pixels corresponds to one of the wide bars 46 or 48 in the start/stop patterns, i.e., that the located principal bar is a wide bar. In general, the terms principal bars and wide bars are used interchangeably herein.

Thereafter, in step 118, the processor 60 calculates an X-dimension for the symbol 40 based on the widths of bars adjacent to the principal bars. As is known, in the PDF 417 symbology, the large bars in the start and stop patterns are followed by three bars having a single X-dimension in width. As a result, the present invention analyzes the widths of these bars, sums them and derives an average X-dimension for the symbol. Alternatively, the present invention determines a "gradient direction" or greatest change in pixel intensity for an edge of the bar determining step 116. The gradient direction is typically perpendicular to an edge of the bar, and therefore sampling along the gradient direction, the processor 60 can determine a width of the bar. Thereafter, the processor 60 in step 118 can divide the determined width by 8 to drive an average X-dimension.

In step 120, the processor 60 analyzes each of the edges detected from the 16 beams in step 112 to locate any bars having a width greater than 5 X-dimensions, and less than 10 X-dimensions. There are two possible directions for collecting potential bars or elements, which for convenience and ease of understanding, are designated as "left" and "right"

directions. The right direction is a direction outward from the center point 219 of a searching star 220 and the left direction is a direction toward the center point of a searching star. If the relative width of a bar located in step 120 is more than 5 and less than 10 X-dimensions, the processor 60 saves the location of the bar in another array, where the bar begins, and its corresponding X-dimension. Such located bars are likely the wide bars 46 and 48 for the symbol 40, since only such wide bars are found in the start/stop patterns 42 and 44 in the PDF 417 symbology.

Since the principal bars (i.e., the wide bars 46 and 48 of the start/stop patterns 42 and 44 in the symbol 40) frame the symbol, their geometrical parameters are an important criteria for identifying the symbol's location. A first verification of a bar located in steps 116 and 120 as a principal bar is the calculation of a minimum acceptable length of the principal bar's edge or coast lines and a comparison of opposite coast lines for parallelism.

Figure 18:
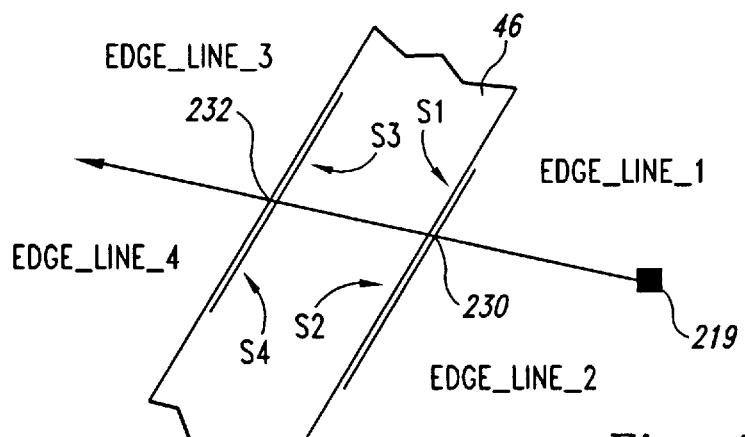
FIG. 18 is an enlarged wide bar of the symbol of FIG. 10 and one sampling path being analyzed for the star pattern of the present invention.

Thus, in step 122, the processor 60 first calculates the pixel coordinates of a coast line's two segments and their lengths. In other words, in step 122, the processor 60 selects an edge point for a bar located in step 120, and calculates line segments extending substantially perpendicularly therefrom to define edges on opposite sides of the located edge point. Applying this function to two opposite coast lines provides four arrays, edge_line_1, edge—line_2, edge_line_3, edge_line_4 and fours lengths, S1, S2, S3, S4, as depicted in FIG. 18. The identification of a coast line is based on the premises that a coast line can't be shorter than N pixels and that the boundaries of a principal bar are relatively straight. These premises help to avoid later unnecessary calculations.

To locate the coast lines for each identified bar in the stored image, the processor 60 in step 122 first determines if each detected edge point in the set of edge points is indeed a point of an edge (rather than simply noise, a printing defect, etc.), and evaluates a "dominant direction" of the edge point. Thereafter, the processor 60 in step 104 calculates top-down and left-right density differences of the edge to approximately characterize the spatial orientation of the edge (i.e., whether it is oriented horizontally or vertically) so that an appropriate template can be applied to an area adjacent to each edge point to determine position coordinates for a possible edge. In other words, in step 104, the processor 60 initially filters edge points that are not edge points of wide bars and determines coordinates and orientation of the bar based on the applied template, as described below.

Figure 19:
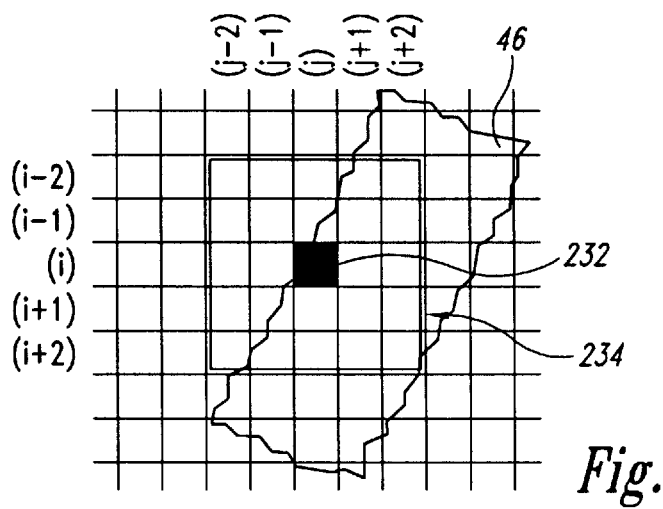
FIG. 19 is an enlarged portion of the wide bar of FIG. 18 having an exemplary grid of image elements or pixels overlaid thereon.

Referring to FIG. 19, the processor 60 in step 122 analyzes neighboring pixels within an environmental area 234 that surrounds an edge point 232. The edge point 232 is a point on one of the wide bars 46 or 48 (indicating a change in intensity from white to black). The edge point 232 has coordinates (i, j), whereas the environmental area 232 is a square area that spans coordinates (i−2, j−2) to (i+2, j+2), resulting in a 5×5 pixel area. Of course, larger or smaller environmental areas 234 could be used at the sake of processing speed versus accuracy. To determine a top-bottom density difference, the processor 60 calculates a number of pixels within the top two rows of pixels, and the bottom two rows of pixels, that have an intensity or brightness greater than the previously calculated local intensity threshold. The pixel coordinates for the top and bottom parts of the area 234 of the edge point 232 are as follows:

$$\text{Top Portion} = \{\{(i-2),(j-2)\}, \{(i-2),(j-1)\}, \{(i-2),(j)\}, \{(i-2),(j+1)\}, \{$$

$$(i-2),(j+2)\}, \{(i-1),(j-2)\}, \{(i-1),(j-1)\}, \{(i-1),(j)\}, \{$$

$$(i-1),(j+1)\}, \{(i-1),(j+2)\}\},$$

$$\text{Bottom Portion} = \{\{(i+2),(j-2)\}, \{(i+2),(j-1)\}, \{$$

$$(i+2),(j)\}, \{(i+2),(j+1)\}, \{(i+2),(j+2)\}, \{(i+1),(j31\ 2)\}, \{$$

$$(i+1),(j-1)\}, \{(i+1),(j)\}, \{(i+1),(j+1)\}, \{(i+1),(j+2)\}\} \quad (1).$$

Likewise, left-to-right pixel density differences are calculated based on intensity values greater than the calculated threshold for the left two columns and right two columns in the area 234, as represented by the following equation:

$$\text{Left Portion} = \{\{(i-2),(j-2)\}, \{(i-1),(j-2)\}, \{$$

$$(i),(j-2)\}, \{(i+1),(j-2)\}, \{$$

$$(i+2),(j-2)\}, \{(i-2),(j-1)\}, \{(i-1),(j-1)\}, \{(i),(j-1)\}, \{(i+1),(j-1)\}, \{(i+2),(j-1)\}\},$$

$$\text{Right Portion} = \{\{(i-2),(j+2)\}, \{(i-1),(j+2)\}, \{$$

$$(i),(j+2)\}, \{(i+1),(j+2)\}, \{(i+2),(j+2)\}, \{(i-2),(j+1)\}, \{$$

$$(i-1),(j+1)\}, \{(i),(j+1)\}, \{(i+1),(j+1)\}, \{(i+2),(j+1)\}\} \quad (2).$$

The Top, Bottom, Left and Right Portions each represent a sum of the number of pixels within each Portion that are greater than the local intensity threshold. If each white pixel is assigned a value of 1, while each black pixel is assigned a value of 0, then for the example of FIG. 19, the Top Portion would have a value of 6. The Bottom Portion would in this example have a value of approximately 3. The top-bottom density difference is equal to the absolute value of the top portion minus the bottom portion (i.e., 6−3=3). Likewise, the left-right density difference is equal to the absolute value of the left portion minus the right portion (approximately 9−0=9).

If the following inequality:

$$(\text{abs}(\text{TopPortion} - \text{BottomPortion}) \geq \text{abs}(\text{LeftPortion} - \text{RightPortion}) \quad (3)$$

is true, then the horizontal direction is dominant; otherwise, the vertical direction is dominant for the area 234. For the example shown in FIG. 19, since the top-bottom portions are less than the left-right portions, the vertical direction is dominant under equation (3) above. Based on the dominant direction, the processor 60 in step 122 applies an appropriate searching template (which for the example of FIG. 19, is the horizontal template) to identify and store the positions of edge pixels for a coast line.

Referring to FIGS. 20 and 21, if the processor 60 determines in step 122 that the dominant direction is vertical, then the processor applies a horizontal searching template consisting of an immediately adjacent upper and lower rows of pixels 236 and 238 for edge points 232 and 230 of the wide bar 48, all respectively. Similarly, as shown in FIGS. 22 and 23, if the dominant direction is horizontal, the processor 60 applies a vertical searching template consisting of the immediately adjacent left and right vertical columns of five pixels 240 and 242, respectively. FIGS. 20 and 21 show searching templates for the bar 46 having a vertical dominant direction and FIGS. 22 and 23 show searching templates for the bar having a horizontal dominant direction.

The processor 60 stores the coordinates of pixels from "i" segments of a coast line in an array. The processor 60 discards any line segment which includes less than 16 pixels. Therefore, if any of the four lengths S1–S4 have a length less than 16 pixels, then the processor 60 determines that such a line segment is too small for processing under the subsequent steps. For example, the scanning beam could cut through one of the wide bars near its upper or lower ends, so that one of the four line segments extends beyond the upper or lower end of the wide bar. Alternatively, the processor 60 could have located a large black blob, or other optical distortion within the stored image 200.

For all accepted line segments, the processor 60 in step 124 then calculates an orientation angle coefficient where coef_1_1 is the orientation angle coefficient of a segment edge_line_1, coef_1_2 is the orientation angle coefficient of a segment edge_$line$_2, coef—2_1 is the orientation angle coefficient of the segment edge_line_3, and coef_2_2 is the orientation angle coefficient of the segment edge_line_4. In general, the processor 60 under the routine 100 preferably employs the known equation for a line Y=KX+B to determine the orientation angle coefficient, where K is the slope or orientation angle coefficient. The orientation angle coefficient, and the equations of the lines in general, are determined by the processor 60 with respect to absolute coordinates of the stored image 200.

The processor 60 in step 124 calculates the coefficients coef_i_j by averaging angle coefficients of lines connecting two points along each accepted line segment, where the two points are dispersed at equal distances along the line. The processor 60 preferably determines the angle coefficient from a line based on two selected points that are 10 pixels apart and on the coast line. The processor then selects two new points, offset 1 pixel from the previous two points, and recalculates the orientation angle coefficient. This process repeats at least, e.g., eight times, and thereafter, the processor determines an average of the eight or more calculated orientation angle coefficients. If the processor chose fewer than 10 pixels between the two points, then the calculated angle coefficient could deviate too much if the edge of the wide bar 46 were bumpy or distorted. Alternatively, if greater than 15 pixels are employed, then an incorrect average could be obtained, and the average would not compensate for a curving wide bar.

In step 126, the processor 16 determines whether line segments for a located coastline of a bar correspond to that for a principal bar 46 or 48 of a start/stop pattern 42 or 44. A marked bar is accepted as a principal bar in step 126 if the difference between any opposite pair of orientation angles is less than 5°. In this way, the processor 60 determines that opposite coast lines of a marked bar are parallel. The previously-mentioned, possible pairs of opposite orientation angles are: coef_1_1 and coef_2_1, coef_1_1 and coef_2_2, coef_1_2 and coef_2_1, and coef_1_2 and coef_2_2. Before taking the differences, the processor 60 in step 126 recalculates the sign for every angle to compensate for any error, which can occur during angle calculations due to approximated coordinates of coast line pixels. As noted above, the routine 100 generally operates on only single pixel values, rather than averaging or estimating the location of a bar that may extend between or through several pixels (as shown in FIG. 21). Importantly, in the absolute coordinate system employed by the present invention for the stored image 200, a change in an orientation angle from plus or mninus 0° or 90° can result in a sign change that may double an error or difference value between two angle coefficients. Therefore, the processor 60 in step 126 compensates for such a sign change if the orientation angles are near 0° or 90°.

Figure 24:
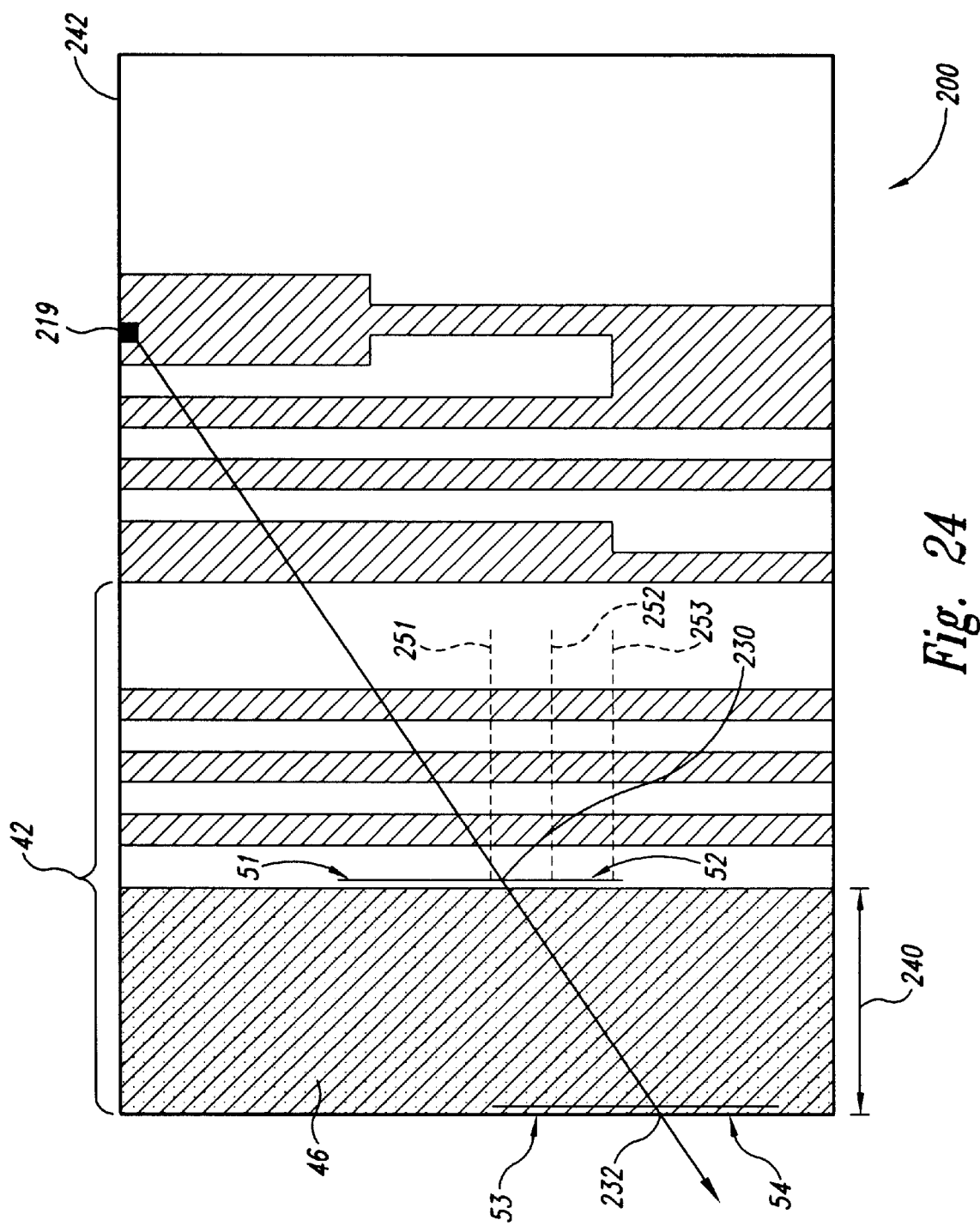
FIG. 24 is an enlarged portion of a line being analyzed according to the present invention according to still another aspect thereof FIGS. 25 through 27 together form a flow diagram of data flow in an implementation of the present invention.

In step 128, the processor 60 begins to verify that an accepted principal bar is a part of a start/stop pattern and identify what pattern was found (i.e., the start pattern or the stop pattern). First, as depicted in FIG. 24, a width 240 of the selected bar 46 is calculated. The processor 60 in step 128 calculates the width 240 using the orientation of the searching beam from the center point 219, angle parameters of coast lines determined in step 124, and the length between the two edge points 230 and 232. As noted above, the processor 60 samples a path perpendicular to one of the coast lines through the bar 46 to determine its width. In other words, the processor knows that the equation of the coast line passing through the edge point 230 is equal to Y=KX+B, and therefore the line perpendicular to this line has the equation Y=(1/K)X+B. The processor 60 compares the calculated width from step 128 to an estimated width for the wide bar based on the calculated X-dimension or to determine whether the wide bar correlates closely to the width of a typical wide bar and thereby determine whether to accept the located wide bar as a principal bar.

Next, the processor 60 in step 128 constructs three perpendicular lines (shown as lines 251, 252 and 253 in FIG. 24) perpendicular to, and having initial points on, a coast line segment. The three lines extend into a region of high activity 242. The processor 60 determines the region of high activity 242 as being an area along a given searching beam, from the center point 219, where multiple transitions from light to dark pixels occur. For example, as shown in FIG. 24, the region of high activity 242 occurs to the right of the wide bar 46. However, if the symbol 40 were oriented 180° from that shown in FIG. 46, then the region of high activity 242 would extend from the left of the wide bar 46.

The three lines chosen by the processor 60 in step 128 are displaced from each other by $n_1$ and $n_2$ pixels, respectively, where $n_1$ and $n_2$ are equal to 10–15 pixels. The processor 60 samples pixel intensity values along the lines 251–253 to determine the width of adjacent bars and spaces. The routine 100 employs three lines 251–253 because if only one such line were employed, it could pass through an erasure, and therefore not accurately determine the widths of the bars and spaces adjacent to the wide bar. The processor 60 then uses a majority of the sampled widths taken along the three lines. Then, in step 130, the processor 60 employs a correlation function to calculate the closeness of the principal bar and adjoined bars and spaces to the start/stop pattern. The correlation function simply compares the transitions, or widths, of bars and spaces along the three lines 251–253 to confirm that the wide bar 46 forms part of the start pattern 42, and that its neighboring elements are alternating narrow bars and spaces, in the PDF 417 symbology. The processor 60 ultimately accepts the wide bar 46 as being a principal bar if a pre-established number of elements from the start or stop pattern are located at these fixed distances, within a given margin of error (based on relative pixel widths). If the processor 60 initially located the wide bar 48, then it would determine that the wide bar formed part of the stop pattern 44 based on the analysis of the widths of the bars and spaces determined from the three lines 251–253.

If the processor 60 in any of the steps 122–130 fails to locate one of the wide bars 46 or 48, and its start/stop pattern 42 or 44, then the processor selects another bar from those stored in an array in step 120. Thereafter, the processor 60 performs the same steps 122–130 on the newly selected bar.

After identifying and accepting one of the wide bars for the start/stop patterns, the processor 60 under the routine 100 next attempts to locate the other wide bar for the other start/stop pattern. Since the other wide bar is presumably in a direction perpendicular to the located wide bar, the processor 60 in step 132 constructs a searching line perpendicular to the located wide bar 46, in the direction of the activity area 242 (FIG. 24), preferably from one of the edge points 230 or 232. For the example of FIG. 24, the processor 60 in step 132 constructs a search line from the edge point 230, such as the line 251. The processor 60 in step 132 constructs the search line to extend from the edge point 230 all the way through the stored image 200, beyond the initially selected analysis region (e.g., center analysis region 202). As a result, if only one of the wide bars 46 or 48 were located within the center analysis region 202 (or another analysis region), but the other wide bar extended beyond the given analysis region, the processor 60 under the routine 100 would still locate that other wide bar.

Thereafter, the processor 60 performs a series of steps, similar to those described above, to locate and evaluate the located wide bars. Therefore, in step 134, the processor 60 selects all bars having a relative width greater than 5, and less than 10 X-dimensions, in a step similar to step 120 described above. In step 136, the processor 60 calculates a correlation value between adjoining or adjacent bars and spaces perpendicular to the bar located in step 134 to an expected series of widths for bars and spaces of a start/stop pattern for the determined X-dimension. If the correlation value is less than a selected threshold, then the processor 60 discards the bar selected under step 134 and the routine loops back to selecting another bar. In other words, the processor 60 expects to locate a predetermined pattern of bars and spaces adjacent to the located primary bar, which indicates that the primary bar forms a part of one of the start/stop patterns.

In steps 138, 140 and 142, the processor 60 locates opposite coast lines for the second located bar, filters out line segments from the coast lines lacking the minimum length of 15 pixels, calculates angle coefficients for each of the coast line segments and compensates for angle coefficient errors in a manner similar to that performed under steps 122, 124 and 126 described above. Since the processor 60 has determined with a reasonable degree of confidence that the first located bar located and accepted in step 130 is indeed a principal bar, the processor 60 in steps 136–142 can employ slightly more relaxed parameters for correlation inequalities, etc., in locating the second wide bar.

In step 144, the processor 60 confirms that the two located wide bars are substantially parallel to each other. Therefore, in step 144, the processor 60 compares the orientation angle coefficients determined in steps 140 and 124 to each other to determine whether the difference between the two orientation angles of the located principle bars is less than a fixed value. The fixed value is subject to an acceptable geometric distortion of the bar code image in the stored image 200. As noted herein, the stored image can be subject to certain geometrical distortions, but still be decoded by the processor 60. Therefore, the fixed value is dependent on the processing power of the processor 60, and can be, for example, 50°.

In step 146, the processor 60 begins to find boundary or corner points of both principal bars. According to the established terminology these points designated as "final points." The first step of this finding procedure consists of sampling data between two points. The first point is located at approximately the middle of the outer edge principal bar, while the second point is at an edge of the stored image 200. A line connecting these points has the same angle as a principal bar. The processor 60 then stores distances from the beginning of the sampling line (i.e., the first point) to a point where the sampling line crosses the local threshold value. All "white" spaces with a length less than the X-dimension are skipped. The final point is located before a "white" space with a length more than the X-dimension is found, which indicates that an edge of the wide bar is no longer sampled, but instead, the quiet zones surrounding the symbol is being sampled.

Thereafter, the processor 60 selects another point at an edge of the stored image 200, opposite the previously selected second point, and samples along the line from the first point to the another point to locate the other final point for the given wide bar. The processor 60 then in step 146 performs the same steps to find the two final points for the other wide bar.

In step 148, the processor 60 compares the lengths of the two located principal bars to determine if they have somewhat similar lengths. The processor 60 measures the distance between the two final points for one bar and determines if that length is within 50% of the length determined between the two final points of the other principal bar. If not, i.e., the two bars have substantially dissimilar lengths, then the processor 60 determines that the symbol 40 is too geometrically distorted within the stored image 200 to be effectively and efficiently decoded. The user of the reader 50 must then take another stored image of the symbol 40. Alternatively, if the reader 50 has sufficient processing power to decode a very distorted symbol, then the 50% threshold can be altered to be greater than 50%.

If the lengths of the two principal bars are within 50% of each other, then in step 150, the processor 60 constructs a "bounding box" that defines a periphery of the located symbol within the stored image 200. The processor 60 simply connects the four located final points to construct a roughly rectangular region as the bounding box.

Thereafter, in step 152, the processor 60 has accurately determined the outer boundaries and location of the symbol 40 within the stored image 200. The processor 60, in step 152, can then decode the symbol 40 by selecting equally spaced points along each of the wide bars 46 and 48, and then sampling along paths between pairs of opposite points along the bars to sample each row of bars and spaces in the symbol. After sampling all the bars and spaces in each row of the symbol 40, the processor 60 can decode this symbol. Alternatively, in step 152, the processor 60 can output the located bars and spaces in each row to a peripheral device such as a computer.

Although specific embodiments of, and examples for, the present invention are described herein for purposes of illustration, various modifications can be made without departing from the spirit and the scope of the invention, as will be known by those skilled in the relevant art. For example, while the present invention has been generally described above as locating the principal bars of, and constructing a bounding box around, a PDF 417 symbol, the present invention can be applied to locate other machine-readable symbols. Additionally, the present invention can be applied to machine vision systems that require locating rectangular, square, or other linear patterns. The present invention can be readily used in computer systems with robotic arms for locating bar or linear shaped objects in various environments, e.g., in automated assembly environments.

The present invention can also employ other searching techniques, such as those disclosed in the inventor's copending application, entitled "METHOD AND APPARATUS FOR LOCATING AND DECODING MACHINE-READABLE SYMBOLS," filed Feb. 16, 1996, Ser. No. 08/602,624, now U.S. Pat. No. 5,786,583, incorporated herein by reference. The teachings provided herein of the present invention can also be applied to other machine vision systems, not necessarily machine-readable symbol readers. These and other equivalent changes can be made to the invention in light of the above detailed description. Accordingly, the invention is not limited by the disclosure, but instead its scope is to determined entirely with reference to the following claims.

I claim:

1. A method of locating a machine-readable symbol representing encoded information, the symbol including a plurality of selectively spaced two-dimensional geometric shapes, the symbol having a predetermined orientation pattern of at least two elongated shapes or spaces, the method comprising:

storing an image of the symbol;

dividing the stored image into a plurality of analysis regions;

sampling at least two regions along a plurality of sampling paths in each region, wherein the plurality of sampling paths begin from a selected point in each region and end at approximately a boundary of region;

locating an edge point;

analyzing an area adjacent to the edge point to locate a first elongated edge;

locating the first elongated edge based on the sampled linear sampling paths;

determining if the located first elongated edge is an edge of one of the elongated shapes or spaces;

identifying a second elongated edge of another of the elongated shapes or spaces; and defining a position and orientation of the image of the symbol based on the located first elongated edge and the identified second elongated edge.

2. The method of claim 1 wherein storing an image of the symbol stores an image of a PDF417 symbol and wherein the elongated shapes or spaces are first and second wide bars of start and stop patterns that define opposite ends of the symbol.

3. The method of claim 1 wherein dividing the stored image divides the stored image into at least center, top, bottom, left, and right analysis regions, and wherein the center region has an area larger than areas of each of the top, bottom, left and right regions.

4. The method of claim 1 wherein dividing the stored image divides the stored image into at least center, top, bottom, left, and right analysis regions, and wherein the sampling samples the center region before sampling the top, bottom, left and right regions.

5. The method of claim 1 wherein sampling sequentially samples the region along a plurality of approximately linear sampling paths that radially extend from approximately a center point of the region.

6. The method of claim 1 wherein sampling samples the region along a plurality of approximately linear sampling paths, wherein each of the sampling paths extend from a point in the region to an edge of the region.

7. The method of claim 1 wherein locating includes:

determining a dominant direction of the located first elongated edge based on the analyzed area; and applying a vertical searching template for locating a position of the first elongated edge if the dominant direction is horizontal, and applying a horizontal searching template for locating a position of the first elongated edge if the dominant direction is vertical.

8. The method of claim 1, further comprising the step of decoding the information encoded in the symbol based on the located predetermined point of the symbol.

9. The method of claim 1 wherein determining if the located first elongated edge is an edge of one of the elongated shapes or spaces includes:

locating an opposite edge of one of the elongated shapes or spaces;

comparing the opposite edge to the first elongated edge; and ignoring the first elongated edge if the first and opposite elongated edges are not approximately parallel.

10. The method of claim 1 wherein determining includes:

determining an X-dimension of the symbol;

determining a width of the one shape or space having the located first elongated edge;

comparing the determined width to an expected width based on the determined X-dimension; and ignoring the first elongated edge if the determined width substantially differs from the expected width.

11. The method of claim 1 wherein storing an image of the symbol stores an image of a PDF417 symbol, wherein the elongated shapes or spaces are first and second wide bars of start and stop patterns that define opposite ends of the symbol, and wherein determining includes:

sampling along at least one path perpendicular to the located first elongated edge;

comparing the sampled perpendicular path to an expected path through the start or stop patterns; and ignoring the first elongated edge if the sampled path substantially differs from the expected path.

12. The method of claim 1 wherein storing an image of the symbol stores an image of a PDF417 symbol, wherein the elongated shapes or spaces are first and second wide bars of start and stop patterns that define opposite ends of the symbol, and wherein defining includes:

identifying pairs of end points at opposite ends of the first and second elongated edges; and defining a bounding box around the symbol based on the identified pairs of end points.

13. The method of claim 1, further comprising:

determining first and second angles of the first and second elongated edges with respect to a selected line;

comparing the first and second angles;

aborting the method if the first and second angles have a predetermined relationship to a selected value.

14. In a computer system having a processor and a data storage device, a computer implemented method of locating one or more predetermined elongated shapes in an image stored in the data storage device, the stored image possibly including additional elongated shapes, the method comprising:

dividing the stored image into a plurality of analysis regions;

sampling at least two regions along a plurality of sampling paths in each region, wherein the plurality of sampling paths begin from a selected point in each region and end at approximately a boundary of region;

locating a first elongated edge based on the sampled sampling paths;

determining if the located first elongated edge is an edge of the predetermined elongated shape;

determining a dominant direction of the located first elongated edge; and defining the location of the predetermined elongated shape based on the located first elongated edge.

15. The method of claim 14 wherein the stored image includes an image of a machine-readable symbol, wherein the predetermined elongated shapes are first and second bars of start and stop patterns that define opposite ends of the symbol, wherein locating a first elongated edge locates a first elongated edge of the first bar, and wherein the method further includes:

identifying a second elongated edge of the second bar; and defining a position and orientation of the image of the symbol based on the located first and second elongated edges.

16. The method of claim 14 wherein dividing the stored image divides the stored image into at least center, top, bottom, left, and right analysis regions, and wherein the center region has an area larger than areas of each of the top, bottom left and right regions.

17. The method of claim 14 wherein dividing the stored image divides the stored image into at least center, top, bottom, left, and right analysis regions, and wherein sampling samples the center region before sampling the top, bottom, left and right regions.

18. The method of claim 14 wherein sampling sequentially samples the region along a plurality of approximately linear sampling paths that radially extend from approximately a center point of the region.

19. The method of claim 14 wherein sampling samples the region along a plurality of approximately linear sampling paths, wherein each of the sampling paths extend from a point in the region to an edge of the region.

20. The method of claim 14 wherein the locating includes:

determining a dominant direction of the located first elongated edge based on the analyzed area; and applying a vertical searching template for locating a position of the first elongated edge if the dominant direction is horizontal, and applying a horizontal searching template for locating a position of the first elongated edge if the dominant direction is vertical.

21. The method of claim 14 wherein determining includes:

locating an edge opposite to the first elongated edge;

comparing the opposite edge to the first elongated edge; and ignoring the first elongated edge if the first and opposite elongated edges are not approximately parallel.

22. The method of claim 14 wherein the stored image includes an image of a machine-readable symbol, wherein the predetermined elongated shapes are first and second bars of start and stop patterns that define opposite ends of the symbol, and wherein determining includes:

sampling along at least one path perpendicular to the located first elongated edge;

comparing the sampled perpendicular path to an expected path through the start or stop patterns; and ignoring the first elongated edge if the sampled path substantially differs from the expected path.

23. The method of claim 14 wherein the stored image includes an image of a machine-readable symbol, wherein the predetermined elongated shapes are first and second bars of start and stop patterns that define opposite ends of the symbol, and wherein the method further comprising:

identifying a second elongated edge of the second bar;

determining first and second angles of the first and second elongated edges with respect to a selected line;

comparing the first and second angles;

aborting the method if the first and second angles have a predetermined relationship to a selected value.

24. An apparatus for decoding a machine-readable symbol representing encoded information, the symbol including a plurality of selectively spaced two-dimensional geometric shapes, the symbol having a predetermined orientation pattern of at least two elongated shapes or spaces, the apparatus comprising:

a sensor that receives light that is reflected from the symbol and produces an output signal therefrom that resents the reflectance of the shapes and spaces comprising the symbol;

a receiver that receives the output signal and produces a digital signal representing an image of the shapes and spaces of the symbol;

a storage device for storing the digital signal;

a processor for processing the digital signal and producing a signal indicative of the information encoded in the symbol, wherein the processor (a) divides the image into a plurality of analysis regions, (b) samples at least one region along a plurality of sampling paths, (c) locates a first elongated edge based on the sampled sampling paths, (d) determines if the located first elongated edge is an edge is an edge of one of the elongated shapes or spaces, (e) identifies a second elongated edge of another of the elongated shapes or spaces, (f) defines a position of the image of the symbol based on the located first elongated edge and the identified second elongated edge, and (g) decodes the symbol and producing a signal indicative of the information encoded in the symbol based on the defined position of the symbol; and wherein the processor divides the stored image into at least center, top, bottom, left, and right analysis regions, and wherein the center region has an area larger than areas of each of the top, bottom, left and right regions.

25. An apparatus for decoding a machine-readable symbol representing encoded information, the symbol including a pluralitv of selectively spaced two-dimensional geometric shapes, the symbol having a predetermined orientation pattern of at least two elongated shapes or spaces, the apparatus comprising:

a sensor that receives light that is reflected from the symbol and produces an output signal therefrom that represents the reflectance of the shapes and spaces comprising the symbol;

a receiver that receives the output signal and produces a digital signal representing an image of the shapes and spaces of the symbol;

a storage device for storing the digital signal;

a processor for processing the digital signal and producing a signal indicative of the information encoded in the symbol, wherein the processor (a) divides the image into a plurality of analysis regions, (b) samples at least one region along a plurality of sampling paths, (c) locates a first elongated edge based on the sampled sampling paths, (d) determines if the located first elongated edge is an edge is an edge of one of the elongated shapes or spaces, (e) identifies a second elongated edge of another of the elongated shapes or spaces, (f) defines a position of the image of the symbol based on the located first elongated edge and the identified second elongated edge, and (g) decodes the symbol and producing a signal indicative of the information encoded in the symbol based on the defined position of the symbol; and wherein the processor locates the elongated edges by (a) locating an edge point, (b) analyzing an area proximate the located edge point to locate the first elongated edge, (c) determining a dominant direction of the located first elongated edge based on the analyzed area, and (d) applying a vertical searching template for locating a position of the first elongated edge if the dominant direction is horizontal, and applying a horizontal searching template for locating a position of the first elongated edge if the dominant direction is vertical.

26. In a computer system having a processor and a data storage device, a computer implemented method of analyzing an image stored in the data storage device for a predetermined shape, the method comprising the steps of:

defining a point within the stored image, wherein defining defines a point approximately in the center of the stored image; and sampling the stored image along a plurality of approximately linear sampling paths for the predetermined shape, wherein each sampling path extends from the defined point.

27. In a computer system having a processor and a data storage device, a computer implemented method of analyzing an image stored in the data storage device for one or more predetermined shapes, the method comprising:

dividing the stored image into at least a center analysis region and surrounding analysis regions, and wherein the center region has an area larger than areas of the surrounding regions; and sequentially sampling always the center region first, and then sampling the surrounding regions second, until the predetermined shape is located in the stored image.

28. The method of claim 27 wherein dividing the stored image includes dividing the surrounding analysis regions into at least top, bottom, left, and right analysis regions, and wherein the center analysis region has an area larger than areas of each of the top, bottom, left and right analysis regions.

29. The method of claim 27 wherein dividing the stored image divides the stored image into at least center, top, bottom, left, right and corner analysis regions, and wherein sequentially sampling samples the center analysis region first, the top, bottom, left and right analysis regions second, and the corner analysis regions third.

30. The method of claim 27 wherein dividing the stored image includes dividing the surrounding analysis regions into at least top, bottom, left, and right analysis regions, and wherein sequentially sampling samples the center analysis region first, the top and bottom regions second and the left and right analysis regions third.

31. The method of claim 27 wherein dividing the stored image divides the stored image into nine regions.

32. The method of claim 27 wherein analyzing includes:

defining a point within at least one of the regions of the stored image; and sampling the region a plurality of approximately linear sampling paths for the predetermined shape, wherein each sampling path extends from the defined point.

33. In a computer system having a processor and a data storage device, a computer implemented method of analyzing an image stored in the data storage device for one or more predetermined shapes, the method comprising:

dividing the stored image into at least center, top, bottom, left, right, and corner analysis regions; and analyzing always the center region first, before analyzing the top, bottom, left, and right regions second, and the corner regions third to determine the location of the predetermined shape or shapes in the stored image.

34. The method of claim 33 wherein in dividing the stored image the center region has an area larger than areas of each of the top, bottom, left, right, and corner regions.

35. The method of claim 33 wherein dividing the stored image divides the stored image into at least center, top, bottom, left, and right analysis regions, and wherein the top and bottom regions are analyzed before the left or right regions.

36. The method of claim 33 wherein dividing the stored image divides the stored image into nine regions.

37. The method of claim 33 wherein analyzing includes:

defining a point within at least one of the regions of the stored image; and sampling the region a plurality of approximately linear sampling paths for the predetermined shape, wherein each sampling path extends from the defined point.

* * * * *

UNITED STATES PATENT AND TRADEMARK OFFICE
CERTIFICATE OF CORRECTION

PATENT NO : 6,064,763
DATED : May 16, 2000
INVENTOR(S): Pavel A. Maltsev

It is certified that error appears in the above-identified patent and that said Letters Patent is hereby corrected as shown below:

Column 15, line 52, after "wherein", delete "the";

Column 18, line 15, change "resents" to --represents--;

Column 18, line 28, delete "is an edge", second occurrence; and

Column 18, line 65, delete "is an edge", second occurrence.

Signed and Sealed this

Twenty-seventh Day of March, 2001

NICHOLAS P. GODICI

*Attest:*

*Attesting Officer*   Acting Director of the United States Patent and Trademark Office